United States Patent [19]
Pfeiffer

[11] Patent Number: 5,575,202
[45] Date of Patent: Nov. 19, 1996

[54] SAFETY DEVICE IN A PLATEN PRESS FOR PROCESSING PLATE-LIKE WORKPIECES

[75] Inventor: Hakan Pfeiffer, Mont-Sur-Rolle, Switzerland

[73] Assignee: Bobst SA, Lausanne, Switzerland

[21] Appl. No.: 449,792

[22] Filed: May 24, 1995

[30] Foreign Application Priority Data

May 24, 1994 [CH] Switzerland .......................... 01592/94

[51] Int. Cl.⁶ .............................. B30B 15/14; B30B 15/28
[52] U.S. Cl. ........................ 100/45; 72/4; 83/61; 83/62; 100/53; 100/215
[58] Field of Search ................................ 100/45, 53, 215, 100/286; 83/61, 62; 72/4

[56] References Cited

U.S. PATENT DOCUMENTS

| | | | |
|---|---|---|---|
| 4,387,632 | 6/1983 | Heiberger | 100/53 |
| 4,466,318 | 8/1984 | Schoch | 83/62 |
| 4,627,253 | 12/1986 | Tennessen et al. | 72/4 |
| 5,091,962 | 2/1992 | Malloy et al. | 83/62 |

FOREIGN PATENT DOCUMENTS

| | | | |
|---|---|---|---|
| 690659 | 5/1967 | Belgium . | |
| 2439634 | 5/1980 | France . | |
| 2757253 | 7/1979 | Germany | 100/53 |
| 3134789 | 5/1982 | Germany . | |
| 1556801 | 4/1990 | U.S.S.R. | 72/4 |
| 847810 | 9/1960 | United Kingdom . | |
| 987232 | 3/1965 | United Kingdom | 83/61 |

Primary Examiner—Stephen F. Gerrity
Attorney, Agent, or Firm—Hill, Steadman & Simpson

[57] ABSTRACT

A safety device which prevents a gripping bar from being squeezed in a platen press that processes plate-like workpieces. This press comprises a fixed upper beam and a movable lower beam which is raised recurrently by a driving device. The safety device comprises a pick-up for emergency situations having the form of a cell for directly scanning the passage of the gripper bar, which cell is arranged at a point of the outlet of the gripper bar from the press. The cell will actuate a switch of an emergency braking device arranged in the drive of the lower beam. Preferably, the scanning cell is an inductive pick-up detecting the proximity of a metal mass.

4 Claims, 3 Drawing Sheets

SAFETY DEVICE IN A PLATEN PRESS FOR PROCESSING PLATE-LIKE WORKPIECES

BACKGROUND OF THE INVENTION

The present invention is directed to a safety device which prevents a gripper bar from being squeezed or engaged in a platen press that is processing plate-like workpieces, such as sheets of paper or cardboard.

A processing machine for sheets of paper or cardboard usually comprises an infeed station in which a pile of sheets is arranged. Every sheet is successively taken from the top of the pile in order to be carried onto a feeding table. On this table, every sheet is aligned on front lays or stops and side marks or stops prior to being seized at its front edge by a series of grippers mounted along a crossbar, whose ends are attached to a train of lateral continuous chains which carry the bar and, thus, the sheet into and through the processing stations. The processing stations can be a die-cutting platen press followed by a waste stripping station. The processing stations are usually followed by a delivery station in which every sheet is released by the grippers and aligned when dropped on a top of a pile which accumulates on an outlet pallet.

A platen press used in such a machine normally comprises a lower beam raised at each cycle of the machine until its upper plane surface will apply a pressure on a plane metal plate belonging to a fixed upper beam, which is mounted between the sides of the frames of the station. The movable beam is usually raised at four points, each by a toggle driven by a push-rod connected to the same crankshaft. This crankshaft is, in turn, driven or rotated by a vertical toothed gear which is engaged by an endless screw arranged on a horizontally rotating axis connected at one of its ends to an inertia flywheel driven by a motor, for instance, by means of belts.

As may easily be gathered, a machine cycle corresponds to a complete circuit of the crankshaft involving an ascent and descent of the lower beam. It is then handy to qualify the instants and the terms of this cycle into "machine angle" $\theta$ ranged between 0° and 360° in order to establish relationships with the successive positions of each element of the press and/or of the gripper bar in a way independent from the final production speed. For instance, the high dead center $\theta_{PMH}$ and the low dead center $\theta_{PMB}$ of the lower beam corresponds, respectively, to the angles of 50° and 230° of the crankshaft, whereas the outlet angle $\theta_{sor}$ when the gripper bar leaves the platen press corresponds to an angle of 298° and a little before its standstill or dwell in the advancement of the gripper bars for positioning the sheets in the platen press during the die-cutting operation.

In the course of a run, it may happen that a sheet is not properly seized by the grippers or that two sheets are simultaneously taken or that one of them breaks, which fact, at the end, always causes an accumulation of sheets, also called a jam, in one of the stations of the machine. The occurrence of a jam converts immediately into an overpressure on the conveying chains for the gripper bars. A safety coupling arranged in the drive of this chain conveyor opens quickly and causes a standstill of the chains and then of the machine.

If a jam occurs when the gripper bar enters in the press, whereas the lower beam is close to its low dead center, a general standstill or stopping of the machine is sufficiently quick to stop the lower beam from rising. However, if such a jam occurs when the bar is just on the way to leave the press, the lower beam is being raised toward its high dead center position, the gripper bar might still stop in the press with no possibility of stopping the lower beam, which then squeezes or crushes the bar on the upper beam. Prior to starting the machine again, it is then necessary to change this damaged bar, which action extends the down-time of the machine.

In order to avoid this type of accident, a particular safety device is installed in the platen press to urgently and quickly brake this lower beam. The device used at present comprises a pick-up or detector in the safety coupling of the drive for the chain conveyor which detects an emergency opening. This pick-up then transmits the signal to a switching device which sets into operation a brake arranged in the drive of the crankshaft of the press, for instance jaws which will close either on the shaft of the endless screw, on the inertia flywheel or on a disc specially fitted parallel to the flywheel.

While this arrangement is satisfactory with certain presses, this safety device becomes inoperative for other presses as soon as the configuration or the track of the lower beam or of the drive elements or of the braking elements are slightly modified.

SUMMARY OF THE INVENTION

An object of the present invention consists in a safety device in a platen press comprising a pick-up or detector for emergency situations actuating a switch of a braking device arranged in the drive of the lower beam, which should be more reliable and, specifically with a shorter counter-reaction term or time delay.

This object is achieved by the fact that the pick-up or detector for emergency situations is a cell for direct scanning of the passage of the gripper bar, which pick-up is arranged at a position of the outlet of the press. Owing to the appropriate position of this pick-up with the instant reaction, it is no longer necessary to take into account the angular waiting term or time delay $D_{detect}$ between the accidental stopping of the gripper bar and the detection of this condition at the rear of the machine at the point of the safety coupling located in the drive for the chain conveyor.

This pickup can be a photoelectric cell which receives a reflection of a light source from the bar or might be a mechanical interrupter whose finger is pushed by the passage of the bar. However, due to the reliability and cost considerations, the pick-up or cell is preferably an induction pick-up reacting to the passage of the metal mass in its neighborhood, which metal mass consists of the mounting fixture that connects the gripper bar to the chain.

In a preferred way of realization, the scanning cell is arranged on the normal passage of the gripper bar at the angular instant $\theta_{lect}$ proceeding the angular instant $\theta_{ecra}$ which corresponds to the moment when the height difference between the two beams of the press becomes less than the thickness of the bar and in terms equal to the sum of the reaction term or time $D_{cummut}$ of the switch and of the braking term or time $D_{frein}$ of the lower beam up to a full standstill of the beam by means of its emergency braking device.

In other words, with the scanning cell of the gripper bar having an instant reaction, it is possible to set, at the last minute, the emergency braking of the lower beam into operation and avoid all the risks of squeezing, i.e., if, and only if, the gripper bar has not yet passed, whereas it remains only the minimum term for stopping the lower beam before the latter begins to touch the bar. The scanning "as late as possible" allows the arrangement of the cell close to the outlet of the press and leaves only a small risk area in which a standstill of the bar may still be fatal.

Obviously, the angular outlet instant $\theta_{sor}$ of the gripper bar outside the platen press is, by definition, anterior to the angular squeezing instant $\theta_{ecra}$ of the bar expressing the fact that the gripper bar can normally come out before the plate-like workpiece is processed. Usefully, the switch and the braking device of the lower beam are optimized in such a way that the sum of their reaction times $D_{cummut}+D_{frein}$ are lower than the time included between the instant $\theta_{ecra}-\theta_{sor}$. In this case, the cell can be located at the outlet just outside the press and a scanning of the passage of the bar confirms the effective outlet of the gripper bar.

Other advantages and features of the invention will be readily apparent from the following description of the preferred embodiments, the drawings and claims.

DESCRIPTION OF THE PREFERRED EMBODIMENTS

Figure 1:
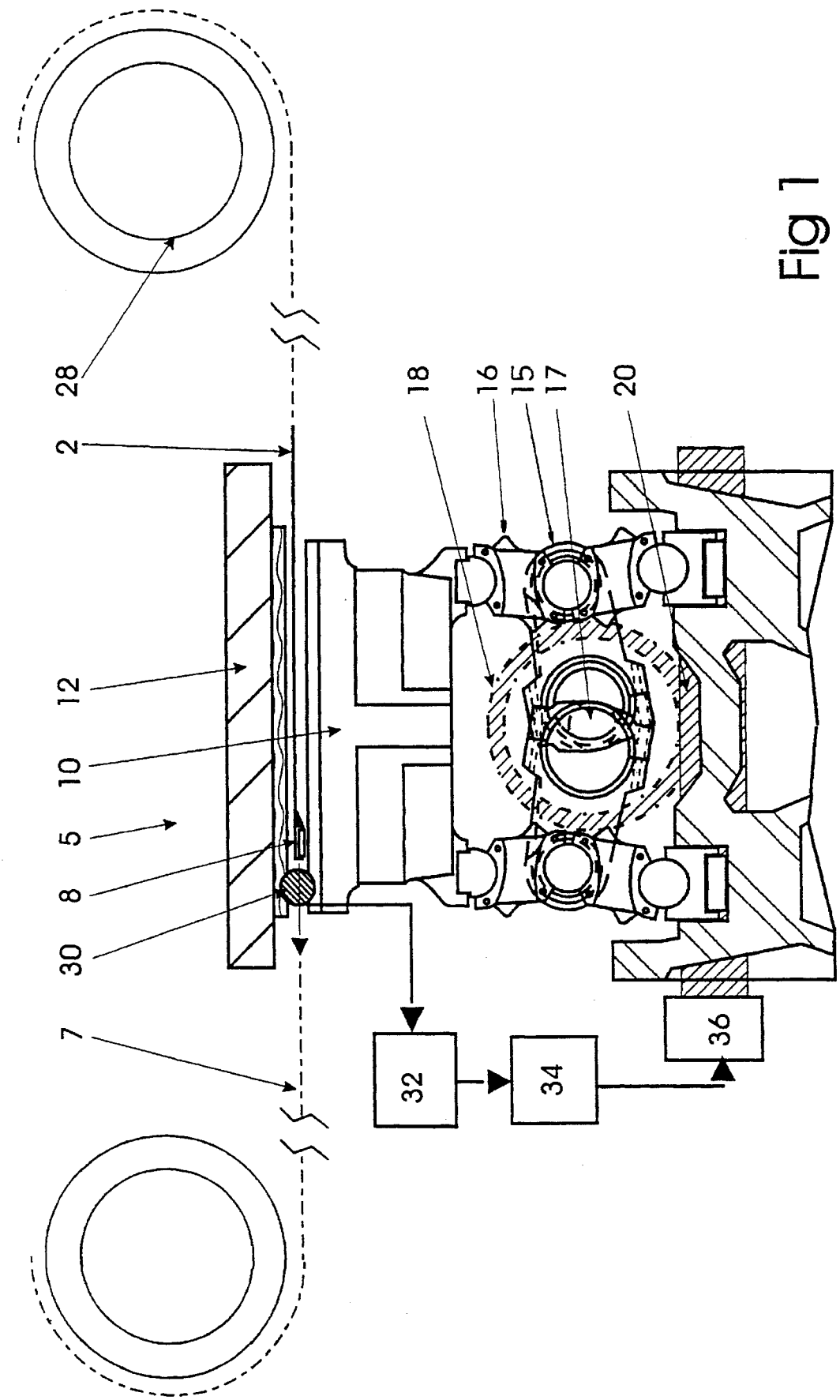
FIG. 1 is a schematic side view of a platen press with an emergency stopping device according to the present invention.

The principles of the present invention are particularly useful when incorporated in a plate press 5 (see FIGS. 1 and 1A), which comprises a fixed horizontal upper beam 12 and a horizontal lower beam 10 movable in a vertical translation. When the lower beam is in the lower position, a sheet of paper or cardboard 2 is carried between these two beams by a gripper bar 8 driven by a conveyor comprising endless chains 7. The lower side of the fixed beam 12 comprises a plurality of cutting rules or a printing or embossing plate on which the lower mobile beam 10 presses the sheet 2 at the end of the high point of the upward movement.

As illustrated, this lower beam is actuated by four toggles 16 which are recurrently actuated by push-rods 15 all connected to the same central crankshaft 17. The crankshaft 17 is rotated by a vertical toothed gear 18, itself engaged with a horizontal endless screw belonging to a drive device 20.

With these sheet processing machines working at high speed, an incident during the process of one of them involving a split or a squeeze very quickly causes an accumulation of the following sheets and a jam in the machine. This jam converts almost instantaneously into an overpressure or strain on the chain 7 of the conveyor which will cause an opening of an elastic safety coupling 28 mounted in the driving device of one of the upstream or downstream toothed wheels, which cause movement of the chains. A gripper bar 8 can, thus, be stopped between the lower beam 10 and upper beam 12 and might risk being squeezed or crushed during the closing of the press.

Figure 1A:
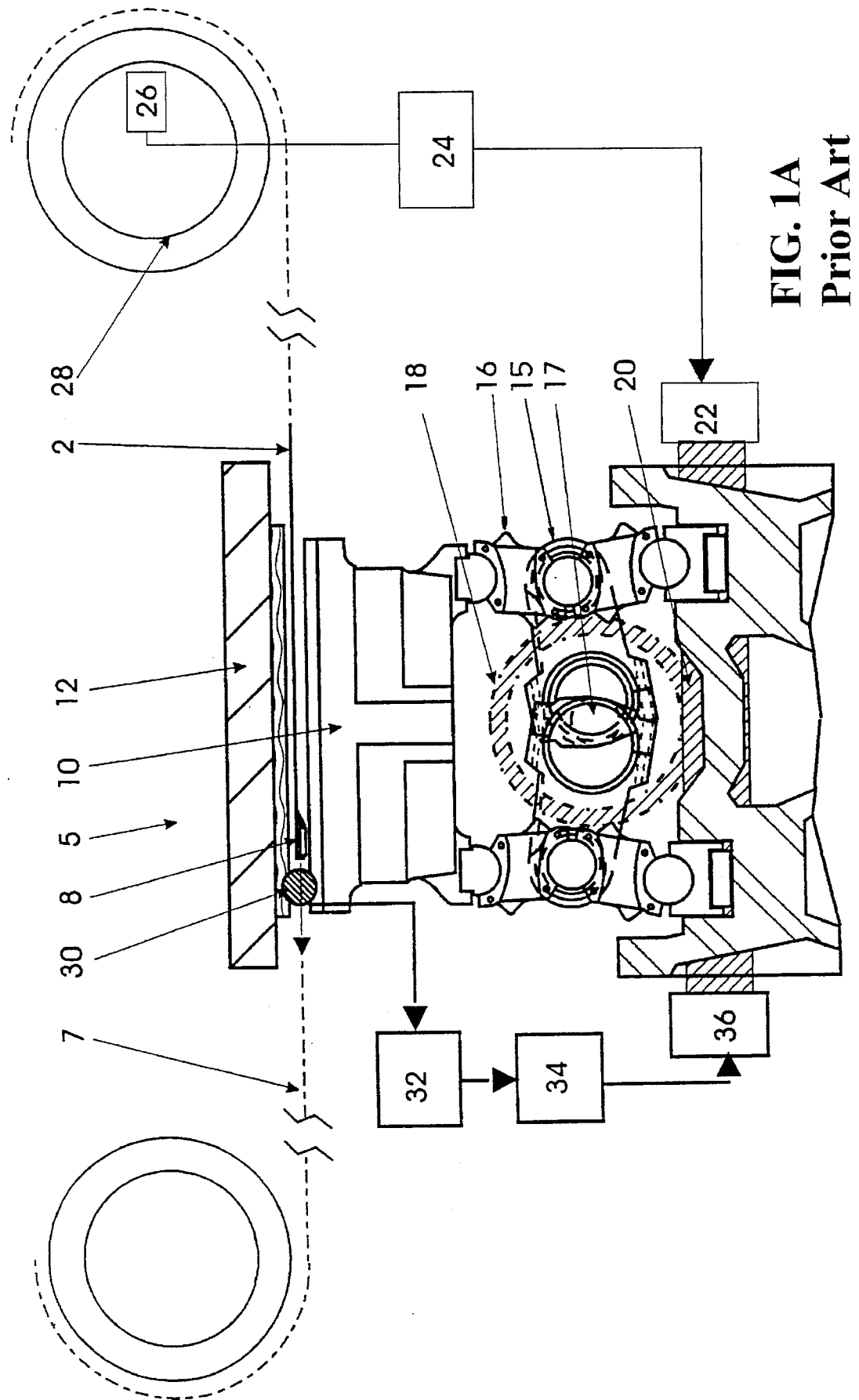
FIG. 1A is a schematic side view of a platen press with an emergency stopping device according to the state of the art.

In order to avoid such a squeeze or crushing, the safety devices, which are presently used and illustrated in FIG. 1A, comprise a first interrupter 26 mounted on the elastic safety coupling 28 and switching immediately with the opening of the latter. The signal issued by this interrupter 26 causes the opening of a switch 24 for either an electric, hydraulic or pneumatic power for the drive of the machine and actuates the emergency brake 22 mounted on the driving device with the endless screw 20 of the lower movable beam 10.

On the contrary, the safety device according to the present invention is based on a scanning cell 30 (FIG. 1) located at an outlet of the press 5 and capable of detecting the passage of the gripper bar 8 as it passes the cell. After numerous tests, an inductive pick-up which is sensitive to the passage of the metal mass which consists of the mounting members that connect the gripper bar 8 to the chain 7 of the conveyor has proven to be particular efficient in the especially hot and dusty environment of the machine. Moreover, such a pick-up involves no mechanical contact, which fact prevents problems with wear. The signal issued by the cell 30 is applied to a comparator circuit 32 which receives, in addition, an indication of the angular position of the crankshaft 17. The outlet of this comparator circuit 32 is applied on a switch 34, which stops the drive and actuates an emergency brake 36 similar to the above-described switch 24 and brake 22.

Figure 2:
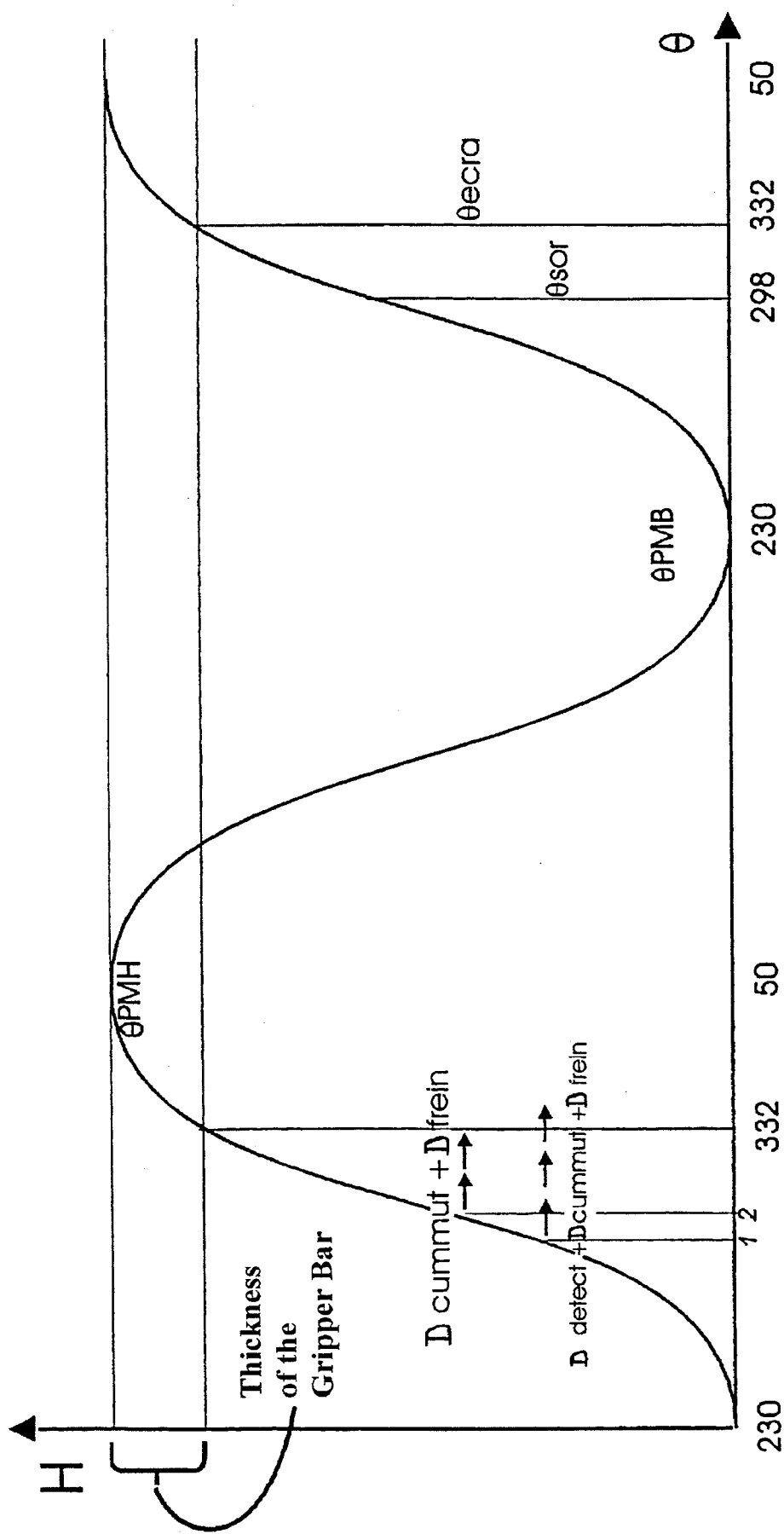
FIG. 2 is a schematic diagram of the motion H of the lower beam according to the machine angle $\theta$.

The advantages of this safety device according to the present invention will come forth when reviewing the diagram of FIG. 2, which represents a track H of the lower movable beam 10 according to an angle $\theta$ of the crankshaft 17.

On this diagram, one sees a high dead center PMH for the beam 10, which occurs at an angle of 50 machine degrees and a low dead center PMB of the beam which occurs at 230 machine degrees. Furthermore, the lower beam reaches the position of the lower part of the gripper bar, which position is equal to PMH minus the thickness of the bar, or about 80° before $\theta_{PMH}$, i.e., about 332 machine degrees. This angle instant is called $\theta_{ecra}$ because it corresponds to the beginning of the squeezing of a gripper bar still present in the platen press. However, with normal operation, this gripper bar is foreseen to be out of the press well before, at an angular instant $\theta_{sor}$ of 298 machine degrees.

In the example of a jam occurring at the angular instant "1" in a platen press provided with a safety device according to the state of the art, one notices that the accumulation of the time $D_{detect}$ necessary for actuating the interrupter 26 at the point of the elastic safety coupling 28 at the end of the chain train, plus the time $D_{cummut}$ for the switching of the circuit 24 and, finally, plus the braking time $D_{frein}$ of the emergency braking device 22 is far greater than the term actually available before the beam reaches the gripping bar, which is then squeezed almost at a full speed of the lower platen.

However, the reaction of the cell 30 and of the comparator circuit 32 being instantaneous, the latter cell is located in the platen press 5 in the area where the gripper bar 8 passes at the angular moment "2" corresponding to the angular moment $\theta_{ecra}$ minus the time $D_{cummut}$ for the switching circuit 24 and the time $D_{frein}$ of the emergency braking device 36.

Then, if the comparator notices that at the instant "2" the gripper bar 7 has not yet passed in front of the cell 30, it reaches the conclusion that there is a jam and immediately sets the emergency braking device of the lower movable beam 10 into operation, which will obviously stop a little before reaching the gripper bar 8. Thus, no squeezing of the gripper bar is then possible.

It has principally proven to be possible to optimize the switching circuit 34 and the braking device 36, even with the slowest power, i.e., pneumatic power, so that the times $D_{cummut}+D_{frein}$ will be lower than the term of 34° separating the angular instant $\theta_{sor}$ and the angular instant $\theta_{ecra}$. This means that the scanning cell 30 is located just outside the platen press 5 directly at the outlet. One then eliminates all risky areas at the outlet end of the platen, in which a stopped gripper bar is not detected and yet squeezed by the press.

Although various minor modifications may be suggested by those versed in the art, it should be understood that I wish to embody within the scope of the patent granted hereon all such modifications as reasonably and properly come within the scope of my contribution to the art.

I claim:

1. In a safety device which prevents a gripper bar from being squeezed in a platen press that processes plate-like workpieces, said press comprising a fixed upper beam and a movable lower beam raised recurrently by a driving means, said safety device comprising a pick-up for emergency situations which activates a switch of an emergency braking device arranged in the driving means of the lower beam, the improvements comprising the pick-up for emergency situations being a cell for direct scanning of the passage of a gripper bar which is arranged at a point of the outlet of the gripper bar from the press.

2. In a safety device according to claim 1, wherein the scanning cell is an inductive pick-up detecting the proximity of a metal mass.

3. In a safety device according to claim 1, wherein the scanning cell is arranged on a normal passage of the gripper bar at an angular instant $\theta_{lect}$ preceding the angular instant $\theta_{ecra}$ which corresponds to the moment when the height difference between the two beams of the press becomes less than the thickness of the bar and is in a term equal to the sum of the reaction time $D_{cummut}$ of the switch and of the braking time $D_{frein}$ of the lower beam up to a full standstill of the lower beam by the emergency braking device.

4. In a safety device according to claim 3, wherein the switch and the braking means of the lower beam are realized in such a way that the sum of their reaction times $D_{cummut} + D_{frein}$ is less than the term included between the instant angles $\theta_{ecra}$ minus $\theta_{sor}$, with $\theta_{sor}$ corresponding to the normal angular outlet instant of the gripper bar from the press.

* * * * *